United States Patent
Lobo

(10) Patent No.: US 11,288,951 B2
(45) Date of Patent: Mar. 29, 2022

(54) IDENTIFICATION OF ANOMALY ON A DETECTOR

(71) Applicant: Carrier Corporation, Palm Beach Gardens, FL (US)

(72) Inventor: Don Patric Lobo, Telangana (IN)

(73) Assignee: CARRIER CORPORATION, Palm Beach Gardens, FL (US)

( * ) Notice: Subject to any disclaimer, the term of this patent is extended or adjusted under 35 U.S.C. 154(b) by 0 days.

(21) Appl. No.: 17/094,944

(22) Filed: Nov. 11, 2020

(65) Prior Publication Data

US 2021/0142654 A1      May 13, 2021

(30) Foreign Application Priority Data

Nov. 13, 2019 (IN) .............................. 201911046130

(51) Int. Cl.
| | |
|---|---|
| G08B 29/00 | (2006.01) |
| G08B 29/14 | (2006.01) |
| G01N 21/53 | (2006.01) |
| G01P 5/00 | (2006.01) |
| G08B 21/18 | (2006.01) |
| G06F 3/14 | (2006.01) |

(52) U.S. Cl.
CPC ......... *G08B 29/145* (2013.01); *G01N 21/534* (2013.01); *G01P 5/00* (2013.01); *G08B 21/182* (2013.01); *G06F 3/14* (2013.01)

(58) Field of Classification Search
CPC .. G08B 29/145; G08B 21/182; G01N 21/534; G01P 5/00; G06F 3/14
USPC ....................................................... 340/506
See application file for complete search history.

(56) References Cited

U.S. PATENT DOCUMENTS

| | | | | |
|---|---|---|---|---|
| 8,717,150 | B2 * | 5/2014 | Egawa ................. | G08B 29/181 |
| | | | | 340/286.05 |
| 10,339,778 | B1 * | 7/2019 | Birnkrant ............... | G01K 13/02 |
| 10,665,251 | B1 * | 5/2020 | Wood, III ........... | G06F 16/9024 |
| 2002/0084907 | A1 * | 7/2002 | Rattman ............. | G08B 29/183 |
| | | | | 340/630 |
| 2004/0246137 | A1 | 12/2004 | Bobenhausen | |
| 2009/0243843 | A1 * | 10/2009 | Clow ................... | G08B 29/046 |
| | | | | 340/540 |
| 2009/0315669 | A1 * | 12/2009 | Lang .................... | E05B 65/104 |
| | | | | 340/3.1 |
| 2010/0328082 | A1 * | 12/2010 | Danz ..................... | G08B 17/10 |
| | | | | 340/589 |

(Continued)

FOREIGN PATENT DOCUMENTS

| | | |
|---|---|---|
| WO | 2011042020 A1 | 4/2011 |
| WO | 2013056395 A1 | 4/2013 |

OTHER PUBLICATIONS

European Search Report for Application No. 20207664.2, dated May 27, 2021, 9 pages.

*Primary Examiner* — Zhen Y Wu
(74) *Attorney, Agent, or Firm* — Cantor Colburn LLP

(57) ABSTRACT

A method, system and devices assisting detection of a cover/cap. The method includes monitoring detection chamber readings from a plurality of detectors and identifying an anomaly in the detection chamber readings. Further, the one or more detectors from the plurality of detectors each having an anomaly are determined from the detection chamber readings. An alert is executed based on the anomaly in the detection chamber readings.

16 Claims, 4 Drawing Sheets

(56) References Cited

U.S. PATENT DOCUMENTS

| | | | |
|---|---|---|---|
| 2011/0068936 A1* | 3/2011 | Shimada | G08B 17/113 |
| | | | 340/584 |
| 2017/0167194 A1* | 6/2017 | Freberg | E06B 9/82 |
| 2017/0248699 A1* | 8/2017 | Fang | G01S 7/51 |
| 2018/0149590 A1* | 5/2018 | Erdtmann | G01N 21/53 |
| 2020/0100115 A1* | 3/2020 | Skaaksrud | G06K 19/0717 |
| 2020/0141796 A1* | 5/2020 | Ishikawa | G01J 1/0488 |

* cited by examiner

IDENTIFICATION OF ANOMALY ON A DETECTOR

FOREIGN PRIORITY

This application claims priority to Indian Patent Application No. 201911046130, filed Nov. 13, 2019, and all the benefits accruing therefrom under 35 U.S.C. § 119, the contents of which in its entirety are herein incorporated by reference.

TECHNICAL FIELD OF INVENTION

The present invention relates generally to a safety device installation and maintenance. More particularly, the invention relates to an apparatus and method for detecting anomaly in fire alarm systems.

BACKGROUND OF THE INVENTION

During new installations and building maintenance activities detectors such as smoke, fire, hazardous gases detectors etc. are covered with a cover/cap to avoid fine air particles such as construction dust, painting fumes etc. entering into a detection chamber of the detectors. As long as any detector is covered with the cap, the air particles cannot enter the detection chamber of the detectors and thereby would not be able to detect smoke or fire or hazardous gas.

If the user/installer has forgotten to remove the detector cover/cap after the maintenance activity is completed or after installation of the detector, the installer needs to check the removal of the cover/cap manually. The detectors are connected to a control panel which displays whether the detectors are functioning normally. Even if the cover/cap is not removed the control panel would still show "System Normal" message. This could cause serious life safety issues, wherein system fails to detect a real fire/smoke and may cause danger to the life and property.

Further, in a conventional device loop wiring arrangement a fire control panel supports up to 250 addressable devices (for example) on a loop and a typical building comprises around 10 such loops (for example). Thus, in this example a technician needs to watch all the 2500 devices to see whether the cap is removed. It is a labor-intensive task to watch each of the 2500 devices to identify if the cap is removed for proper functioning.

If the covered detector is installed in places, such as above the false ceiling or below the false flooring, there is a chance that they get unnoticed by the installer/user and cover/cap on the detector may remain undetected.

The above instances and examples clearly indicate that it may be hazardous to leave any detector with the cap covered. Further, it is also manually intensive and time consuming to identify whether the cap from the detectors has been removed.

Therefore, there is a need in the art to develop methods and systems for identifying whether there is any anomaly associated with the detectors.

SUMMARY OF THE INVENTION

Various embodiments of the invention describe a method for identifying whether one or more detectors associated with a control panel are working properly. The method describes monitoring detection chamber readings from a plurality of detectors. The method identifies an anomaly in the detection chamber readings. Further, one or more detectors from the plurality of detectors with the anomaly are determined based on the detection chamber readings. Moreover, an alert is executed based on the anomaly in the detection chamber readings.

In another embodiment of the invention, the anomaly in the detection chamber readings is identified on determining constant detection chamber readings or variation in the detection chamber readings within a predetermined limit for a predetermined time.

In an embodiment of the invention, the detection chamber readings are received by a control panel associated with the plurality of detectors.

In yet another embodiment of the invention, the anomaly in the detection chamber readings is identified if the difference between current detection chamber readings and past detection chamber readings of the one or more detectors is above a predetermined threshold value.

In another embodiment of the invention, the anomaly in the detection chamber readings is identified if the difference between the detection chamber readings of the one or more detectors and other proximate detectors is above a predefined limit.

In still another embodiment of the invention, the anomaly in the detection chamber readings is identified if the one or more detectors provide constant detection chamber readings when the one or more detectors are initialized.

In another embodiment of the invention, the detection chamber readings comprise readings of light scattered by airborne particles when the airborne particles enter a detection chamber of the plurality of detectors, wherein a transmitter transmits a light which is scattered by the airborne particles and received by a photo electric receiver.

In still another embodiment of the invention, the detection chamber readings correspond to amount of light received by the photo receiver after the scattering of light by the airborne particles.

In another embodiment of the invention, the detection chamber readings further comprises light intensity and air velocity inside a detection chamber. The light intensity and the air velocity inside the detection chamber are identified and compared with the light intensity and the air velocity of other proximate detectors.

In another embodiment of the invention, the light intensity and the air velocity inside the detection chamber are identified and compared with the previous readings of the light intensity and the air velocity of the detection chamber.

In yet another embodiment of the invention, the alert is an alert message or an audio alarm executed on a control panel.

In another embodiment of the invention a fire protection system is disclosed for identifying one or more detectors with anomaly. The system comprises a monitoring unit for monitoring detection chamber readings received from a plurality of detectors. There is an identification unit to identify an anomaly in the detection chamber readings. The system comprises a determination unit to identify one or more detectors from plurality of detectors with the anomaly in detection chamber readings. The system also comprises a display unit to display a notification based on the anomaly in the smoke chamber readings by executing an alert.

In another embodiment of the invention, the anomaly in the detection chamber readings is identified on determining constant detection chamber readings or variation in the detection chamber readings within a predetermined limit for a predetermined time.

In yet another embodiment of the invention, the detection chamber readings are received by a control panel associated with the plurality of detectors.

In another embodiment of the invention, the anomaly in the detection chamber readings is identified if the difference between current detection chamber readings and past detection chamber readings of the one or more detectors is above a predetermined threshold value.

In still another embodiment of the invention, the anomaly in the detection chamber readings is identified by if difference between the detection chamber readings of the one or more detectors and other proximate detectors is above a predefined limit.

In an embodiment of the invention, the detection chamber readings comprise readings of light scattered by airborne particles when the airborne particles enter the detection chamber. A transmitter transmits light which is scattered by the airborne particles and received by a photo electric receiver.

In yet another embodiment of the invention, amount of light received by the photo receiver after the scattering of the airborne particles are detection chamber readings.

In still another embodiment of the invention, the detection chamber readings further comprise light intensity and air velocity inside the detection chamber, wherein the light intensity and the air velocity inside the detection chamber are identified and compared with the light intensity and the air velocity of other proximate detectors.

In various other embodiments of the invention a computer readable medium is disclosed comprising one or more processors and a memory coupled to the one or more processors. The memory stores instructions which are executed by the one or more processors to identify one or more detectors with anomaly. The instructions are executed to monitor detection chamber readings of a plurality of detectors and to identify an anomaly in the detection chamber readings. The instructions are executed to determine one or more detectors from the plurality of detectors with anomaly in the detection chamber readings. An alert is executed based on the anomaly in the detection chamber readings.

This summary is provided to introduce a selection of concepts in a simplified form that are further described below in the detailed description. This summary is not intended to identify key features or essential features of the claimed subject matter, nor is it intended to be used as an aid in determining the scope of the claimed subject matter.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

Corresponding reference numerals indicate corresponding parts throughout the drawings.

DETAILED DESCRIPTION OF THE INVENTION

Figure 1:
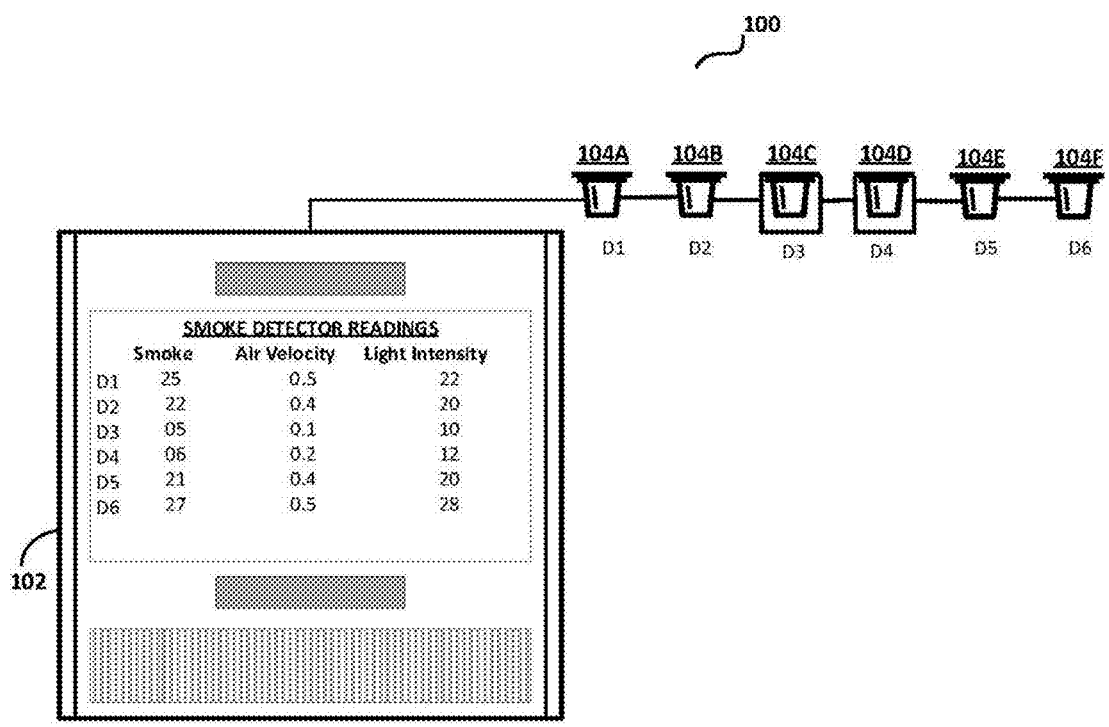
FIG. 1 is an exemplary diagram illustrating a system in accordance with an embodiment of the invention.

Described herein is the technology with systems, methods, and devices for identifying one or more detectors installed in buildings, large premises, airports, shopping malls, museums and the like for any anomaly. In different embodiments of the invention a plurality of detectors are monitored for detection chamber readings by a control panel. The detection chamber readings are identified for any anomaly based on the detection chamber readings of the detectors. Based on the identified anomaly in the detection chamber readings, one or more detectors of a plurality of detectors are determined. An alert is executed based on the anomaly in the detection chamber readings to notify a user regarding the anomaly.

Various embodiments of the invention describe receiving detection chamber readings from a plurality of detectors. The detection chamber readings may comprise amount of smoke/fire in the surrounding air based on determination of various parameters, for example, dust particles and gases such as, carbon monoxide (CO), carbon Dioxide (CO2) and the like. The parameters may also include air velocity, light intensity and other related environmental parameters. The values of environmental parameters detected by each of the plurality of detectors may be quantized and further digitized using an analog to digital converter (ADC) as known in the art and may be referred as "detection chamber readings". The digitized values of the detection chamber readings from the ADC are transmitted to a control panel associated with the plurality of detectors. Alternatively, the detection chamber readings may be transmitted to the control panel directly and the ADC available with the control panel may quantize and digitize the detection chamber readings to obtain digital detection chamber readings. The detection chamber readings may be smoke chamber readings, fire chamber readings, or any hazardous gas chamber readings.

The detection chamber readings are monitored for any anomaly by the control panel. If there is any anomaly in the detection chamber readings, the same is identified. The control panel also looks to determine each of the detector from plurality of detectors showing the anomaly in the detection chamber readings. The control panel is configured to execute an alert for a user such as a technician or a facility manager indicating improper working of the detectors. The control panel may also show the detectors identified with the anomaly.

In an embodiment of the invention, the anomaly may be one or more detectors covered by a cap or cover and showing erroneous detection chamber readings. The cap or cover are generally attached to the detectors when the detectors are installed in any premises. The cap or cover is also attached to the detectors when there is any maintenance activity in the premises. In an alternative embodiment, the anomaly may be related to faulty operation of the one or more detector. For example, the sensors associated with the detectors may be faulty.

In an embodiment of the invention, after detecting the anomaly and identification of the detectors showing erroneous detection chamber readings, the control panel may identify location information of each of the one or more detectors in the premises which are showing erroneous readings. Each of the one or more detectors may be associated with unique identifiers. The control panel may be configured to send an alert to a user device of a technician or a facility manager along with the identified detector with unique identifier and location information. The alert along with the unique identifier and the location information of each detector may be displayed as a notification on a display unit of the control panel.

As used herein, the detector may also be capable of detection and evaluation of a cap or cover or any blockage associated with itself. The invention described herein may be used by the detector to evaluate the environmental parameters. In such as a case, the detection chamber readings are evaluated and identified for any anomaly in the readings. The detector may itself issue an alert which is transmitted to the control panel. The control panel may execute the alert as described herein.

As described herein, the location information may be a GPS location, location as determined using beacons or the position of each detector as determined using Indoor Positioning System.

The facility manager or concerned user may be associated with particular control room which may be notified by the control panel regarding the alert or the fire alarm. In an exemplary embodiment, the alert triggered by the control panel may be associated with the anomaly in the detectors. The control room may have a team of people who may take an action to handle such anomaly. The concerned user or the facility manager may be a visitor of the premises, an employee of the premises, a security member of the premises, a trained Single Point of Contact (SPOC) of the premises, a building management system (BMS) team member of the premises or any such authorized person of the premises.

The one or more detectors described herein can be different types of devices for fire detection and/or hazardous gas detection such as smoke detectors, heat detectors, any gas detectors but not limited thereto. The control panel is capable of issuing controlling actions based on the type of detection obtained from the one or more detectors. The one or more detectors on sensing any specific signals according to their operation may transmit a report indicating the result of sensing. The control panel may take appropriate action based on the report by the one or more detectors. The result of sensing may be detection chamber readings as described herein.

The plurality of detectors may communicate with the control panel through a wired network or wireless network. Also, the detectors may be connected with each other in a loop. The detectors may comprise, but is not limited to, a transmitter, a receiver, a sensing unit, a memory and/or a processor.

As used herein, the alert issued by the control panel may be in the form of display on a display unit of the control panel. The alert may also be in the form of hooter or buzzer with the details of the error displayed on the display unit of the control panel. The alert may also be issued by the control panel and transmitted to a user device of the concerned user such as a mobile device. The control panel may transmit the details of error or anomaly associated with the one or more detectors. The details may include the type of anomaly with the detector, location information of the detector, unique identifier of the detector among other details.

As user herein, the detection chamber readings may be obtained by a photo electric transmitter and receiver placed inside each detector. When airborne particles enter inside a detection chamber of the detector, the light transmitted by the photo electric transmitter is scattered by the airborne particles. The scattered light is received by the photo electric receiver placed inside the detector. The amount of light received by the photo electric receiver is computed to determine the detection chamber readings as known a to a person skilled in the art. Whenever, there is smoke or fire, the number of airborne particles increases and more light is scattered and received in lesser amount at the photo electric receiver. A digitized value of around 50 units (described below) is generally sufficient to raise an alarm for smoke/fire detection. The other environmental parameters such as air velocity and light intensity may also be computed by respective methods as known to a person skilled in the art. The determination of different parameters which can be calculated to determine any anomaly associated with the detectors are within the scope of the invention.

Turning now to figures, FIG. 1 depicts a system (100) for identifying an anomaly associated with a plurality of detectors (104A-104F). The plurality of detectors may include one or more detectors (104C, 104D) with anomaly. The plurality of detectors may sense readings related to environmental parameters. The environmental parameters are collectively referred as "detection chamber readings." The detection chamber readings are transmitted to a control panel (102). A display unit of the control panel (102) displays the detection chamber readings. The detection chamber readings are monitored by different components of the control panel (102). As shown in FIG. 1, the detectors 104C and 104D have the anomaly that they are covered by a cover and therefore, would not be able to detect smoke or fire, if any. Such an anomaly can be indicated in the detection chamber readings of the control panel (102). An alert is issued once the anomaly in the detection chamber readings is detected and displayed by a display unit of the control panel. The alert may be transmitted on a mobile device of a concerned user such as a technician or a facility manager.

The user terminal can be any hand held device such as a smartphone or a tablet and the like with at least a display, a storage unit and network connectivity. As an example, the hand held device may be an Apple® tablet or smartphone, an Android® tablet or smartphone, a Windows® tablet or smartphone and/or the like.

Figure 2:
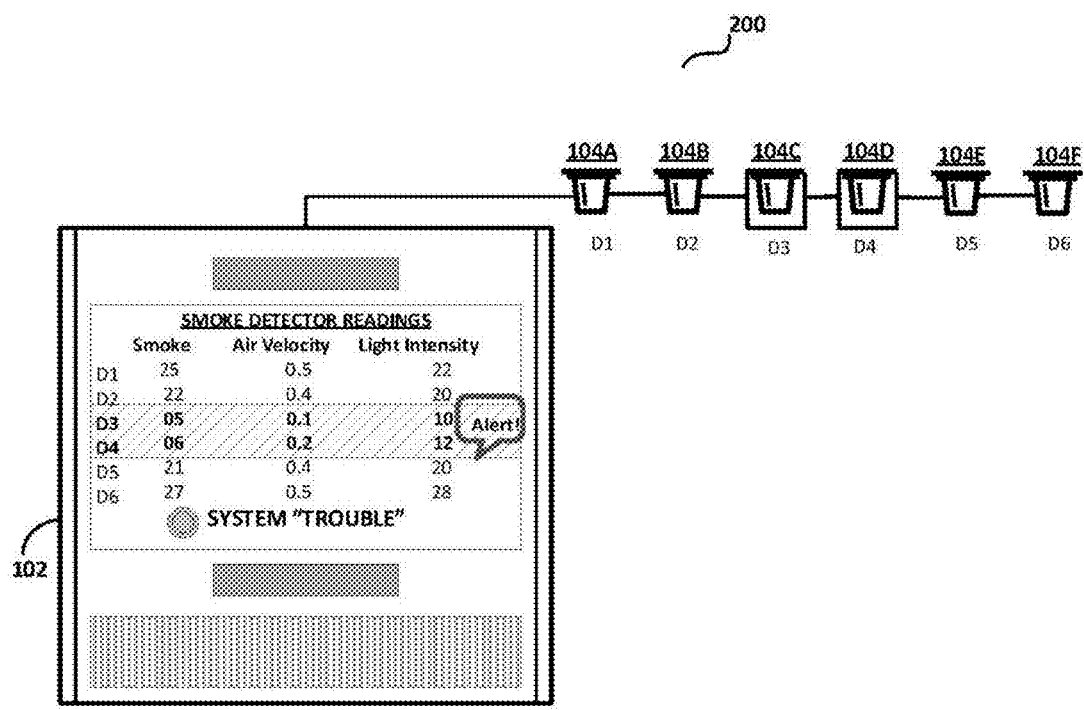
FIG. 2 is an exemplary diagram illustrating a system in accordance with another embodiment of the invention.

FIG. 2 depicts a system (200) similar to the one depicted in FIG. 1. FIG. 2 shows the display unit of the control panel (102) with an error message or anomaly as described above. Once the anomaly associated with the detection chamber readings is detected, an alert issued. For example, the readings of detectors (104C and 104D) are different (with anomaly since covered by a cap or cover) from the neighboring detectors (104B and 104E). This anomaly is detected and a system "trouble" message may be displayed. There may be a pop-up message showing an alert in front of the reading corresponding to the detectors with anomaly.

In an embodiment of the invention, the anomaly in the detection chamber readings may be identified when the detection chamber readings are constant for a predetermined time. The detection chamber readings may be constant when there is some blockade to receive air from surroundings. The blockade may be a cover or cap provided on the detector(s) and as shown in FIGS. 1 and 2. During the blockade, the detection chamber reading may also vary around the constant reading within a predetermined limit.

In another embodiment of the invention, the anomaly in the detection chamber readings is identified if the difference between current detection chamber readings and past detection chamber readings of the one or more detectors is above a predetermined threshold value. In other words, the control panel regularly records the detection chamber readings from each detector. The readings collected by the control panel in past may be compared with current detection chamber readings for each detector. If the difference between the past detection chamber readings and the current detection chamber readings is within 10 units, an alert may be issued by the control panel as discussed above. It is understood that the units described herein may in the form of different SI units used based on the environmental parameter considered to determine the anomaly in the detection chamber readings. For example, if the environmental parameter such as light intensity is being measured by the detector, the detector without a cap such as 104A may show a reading of 22 lux. However, the detector which is covered with a cap or cover such as 104D may have only 12 lux showing a significant reduction in light intensity when a cover is attached with the detector. Accordingly, the detection chamber readings may be used to determine anomaly with different environmental parameters. The light intensity readings are quantized in SI unit (lux) unless otherwise stated.

In yet another embodiment of the invention, the anomaly in the detection chamber readings is identified by if the difference between the detection chamber readings of the one or more detectors and other proximate detectors is above a predefined limit. For example, in FIG. 1 and FIG. 2 it is shown that readings of the detectors 104 with smoke as 22 units for detector 104B and 21 units for detector 104E. However, neighboring detector 104D shows a reading of only 6 units. The readings thus obtained may be used to indicate the anomaly in the detection chamber readings of the detector 104D.

In an embodiment of the invention, the anomaly in the detection chamber readings is identified if the one or more detectors provide constant detection chamber readings when the one or more detectors are initialized. Whenever, any detector is switched on, it may start detecting different environmental parameters. However, if detection chamber readings associated with the detector shows a constant reading for say 30 minutes, it indicates that the detector may not be functioning properly and may be associated with the anomaly. Such a detector may be subsequently checked. The control panel may provide details including location information as described above. This provides easy location and checking of the detector with possible anomaly.

In general, the detection chamber readings comprise readings of light scattered by airborne particles when the airborne particles enter a detection chamber of each of the plurality of detectors. A transmitter transmits a light which is scattered by the airborne particles and received by a photo electric receiver. The amount of scattered light received by the photo electric receiver may be recorded to determine detection chamber readings related to the airborne particles.

In another embodiment of the invention, the photo electric receiver may be placed such that it receives all the light sent by the photo electric transmitter. When the external air particles (airborne particles) enter the detection chamber, the particles scatters the light and photo diode starts receiving lesser light than it was receiving before. As more air particles such as smoke enters the detection chamber, the photo diode will be receiving less light and thereby ADC readings will decrease. When ADC readings reaches below a certain threshold, an alert (such as Fire Alarm) may be raised.

As an exemplary embodiment tables are illustrated where a cover/cap is placed on two detectors D3 and D4 as shown in FIGS. 1 and 2. Table 1 and Table 2 illustrates recording of detection chamber readings based on airborne particles entering inside the detection chamber at different times.

TABLE 1

| Detection Chamber Readings | | | | | | |
|---|---|---|---|---|---|---|
| | D1 | D2 | D3 | D4 | D5 | D6 |
| 13:00 | 8 | 10 | 7 | 10 | 9 | 12 |
| 13:15 | 10 | 10 | 7 | 12 | 11 | 12 |

TABLE 1-continued

| Detection Chamber Readings | | | | | | |
|---|---|---|---|---|---|---|
| | D1 | D2 | D3 | D4 | D5 | D6 |
| 13:30 | 8 | 9 | 7 | 12 | 11 | 9 |
| 13:45 | 9 | 11 | 7 | 13 | 12 | 10 |
| 14:00 | 12 | 9 | 7 | 11 | 10 | 11 |

TABLE 2

| Detection Chamber Readings | | | | | | |
|---|---|---|---|---|---|---|
| | D1 | D2 | D3 | D4 | D5 | D6 |
| 13:00 | 8 | 18 | 7 | 10 | 9 | 12 |
| 13:15 | 10 | 22 | 7 | 12 | 11 | 12 |
| 13:30 | 16 | 30 | 7 | 12 | 11 | 9 |
| 13:45 | 29 | 44 | 7 | 13 | 12 | 10 |
| 14:00 | 34 | 53 | 7 | 11 | 10 | 11 |

Normal condition = 8-15
Alarm = 50 and above
With cap = less than 8

It is depicted in the tables that a detector D1, D2, D4, D5, and D6 are showing detection chamber readings which are varying at different time periods sampled by a control panel. However, detector D3 is showing constant reading of 7 units for all the time samples indicating an anomaly associated with detector D3.

Further, it is shown in Table 2 that there is smoke build up at 13:45 with 44 units which increases to 53 units at 14:00 indicating a time to alert a fire and alarm system. The neighboring detector D3 still shows a constant reading of 7 units. Such a reading indicates that the detector D3 is not working properly and needs to be notified to the concerned user.

TABLE 3

| Detection Chamber Readings | | | | | | |
|---|---|---|---|---|---|---|
| | D1 | D2 | D3 | D4 | D5 | D6 |
| 13:00 | 45 | 68 | 80 | 76 | 75 | 75 |
| 13:15 | 48 | 70 | 82 | 77 | 79 | 79 |
| 13:30 | 42 | 66 | 82 | 75 | 80 | 79 |
| 13:45 | 43 | 69 | 81 | 78 | 77 | 78 |
| 14:00 | 42 | 70 | 83 | 78 | 80 | 80 |

Normal condition = 75-80
Alarm = 50 and below
With cap = more than 80

Table 3 illustrates different detectors D1-D6. Detector D1 describes the value (from ADC) of detector D1 which is below 50 units indicating an alarm needs to be triggered for the value of less than 50 units. The value of less than 50 indicates increase the airborne particles such as smoke to alarming level. In this case due to more number of smoke particles, the light received by the photo receiver is less and accordingly lesser reading for ADC is obtained. A neighboring detector D3 indicates the impact of smoke being developed and reading are in range of 65-70. Detector D3 appears to have constant reading and does not correspond to the readings of neighboring detectors indicating a possibility of anomaly in the detector D3. The readings of D4-D6 appear to be in normal range of 75-80. Accordingly, in this embodiment, different readings from ADC may be used to identify any anomaly associated with the detectors.

The values of time and detection chamber readings mentioned in the tables are for illustration purpose only. The variation in the readings are within the scope of the invention.

Figure 3:
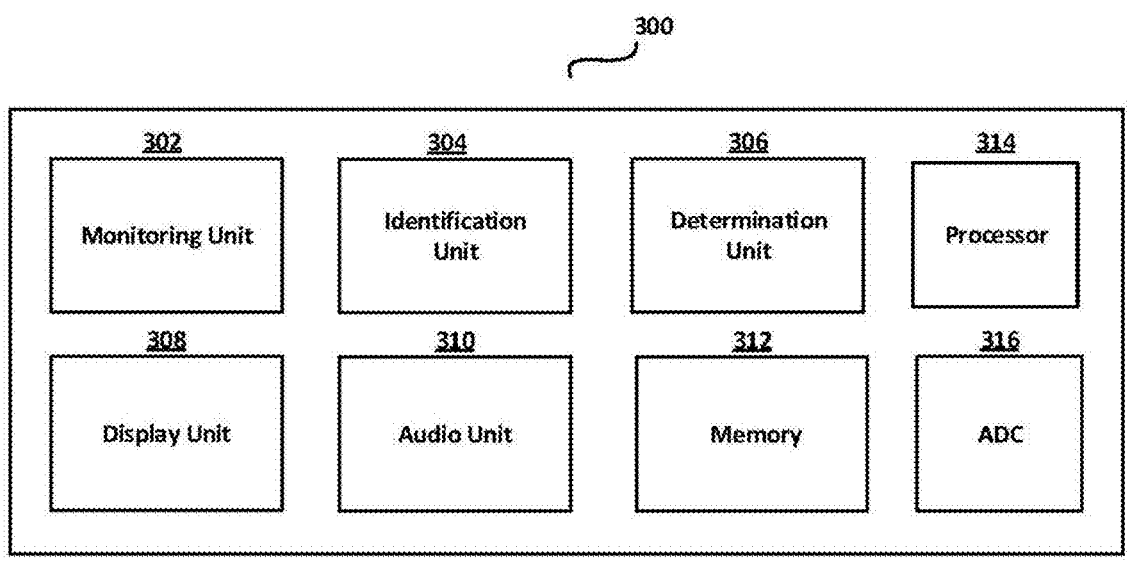
FIG. 3 is an exemplary block diagram showing different components of a user terminal according to an embodiment of the invention.

FIG. 3 depicts the different components of a control panel (300) having same functionalities as the control panel 102 described in FIG. 1 and FIG. 2. The control panel (300) comprises a monitoring unit (302), an identification unit (304), a determination unit (306), a display unit (308), an audio unit (310), a memory (312), a processor (314), and an ADC (316) which work together to achieve the different functions that are performed by the control panel (300). The monitoring unit monitors the detection chamber readings received from the detectors. The detection chamber readings may be converted by ADC (316) to digital values as described above. The detection chamber readings are displayed on the display unit (308). The identification unit (304) of the control panel may identify any anomaly associated with the detection chamber readings for each of the detectors as described above. The determination unit (306) determines one or more detectors each having the anomaly in the detection chamber readings. Accordingly, the control panel may issue an alert by using the display unit (308) and/or the audio unit (310). The display unit may indicate the message of "system trouble" while highlighting the detectors with the anomaly. Also, an audio siren or hootor and the like may be provided to alert a concerned user. Alternatively, a network module (not shown) may be used to send a message to the concerned user indicating the anomalous detection chamber readings.

In an embodiment of the invention, the control panel (300) may be configured to provide identity information, location information with other details on the display unit (308) and/or on a user device to easily identify the anomalous detectors.

The different units described herein are exemplary. The invention may be performed using one or more units. For example, the tasks executed by the monitoring unit (302), the identification unit (304), the determination unit (306), the display unit (308), the audio unit (310), the memory (312), the processor (314), and the ADC (316) may be performed by a single unit. Alternatively, more number of units as described herein may be used to perform the invention.

Figure 4:
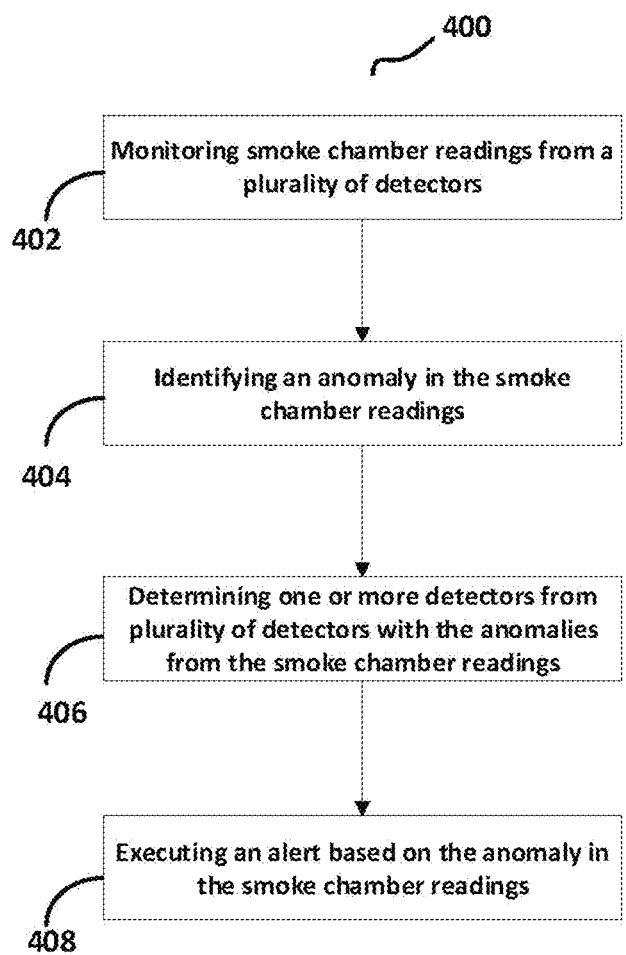
FIG. 4 is an exemplary flowchart illustrating a method to perform the invention according to an embodiment of the invention.

FIG. 4 depicts a flowchart outlining the features of the invention in an embodiment of the invention. The flowchart (400) describes a method being performed for enabling the invention. The method starts at (402) with monitoring detection chamber readings from a plurality of detectors. The detection detector readings are acquired by sensors as discussed above.

At 404, anomaly in the detection detector readings is identified based on the methods described above.

The method may further determine one or more detectors from the plurality of detectors each having the anomaly from the detection chamber readings at 406. The anomaly may be in a single detector or multiple detectors.

On determination of the one or more detectors with the anomaly, an alert is executed based on the anomaly in the detection chamber readings at 408.

Another embodiment of the invention discloses a computer readable medium comprising one or more processors and a memory coupled to the one or more processors. The memory stores instructions which are executed by the one or more processors, the one or more processors are operable to monitor detection chamber readings of a plurality of detectors. The instructions are executed to identify an anomaly in the detection chamber readings. One or more detectors from the plurality of detectors with the anomaly in the detection chamber readings are identified. Further, the instructions are configured to execute an alert based on the anomaly in the detection chamber readings. As discussed above, the on receiving the detection chamber readings from one or more detectors, the one or more processors associated with the control panel may be configured to detect the anomaly. Further, each of the one or more detectors with anomalous detection chamber readings are identified with unique identifiers and location information to alert a concerned user.

The one or more processors may be operable to request the configuration for the one or more devices based on the configuration information with instructions to transmit the configuration to a control panel. The control panel may transmit the configuration to each of the one or more devices for configuration.

The invention provides various advantages of seamlessly identify one or more detectors in a fire protection system of any anomaly by reducing the labor-intensive work and saving significantly on time. The invention described herein is able to prevent the hazards of fire and hence provides increased safety to life and property. Also, the invention is able to proactively notify the use for any possible fire accident.

Exemplary computer readable media includes flash memory drives, digital versatile discs (DVDs), compact discs (CDs), floppy disks, and tape cassettes. By way of example and not limitation, computer readable media comprise computer storage media and communication media. Computer storage media include volatile and nonvolatile, removable and non-removable media implemented in any method or technology for storage of information such as computer readable instructions, data structures, program modules or other data. Computer storage media are tangible and mutually exclusive to communication media. Computer storage media are implemented in hardware and exclude carrier waves and propagated signals. Computer storage media for purposes of this invention are not signals per se. Exemplary computer storage media include hard disks, flash drives, and other solid-state memory. In contrast, communication media typically embody computer readable instructions, data structures, program modules, or other data in a modulated data signal such as a carrier wave or other transport mechanism and include any information delivery media.

Although described in connection with an exemplary computing system environment, examples of the invention are capable of implementation with numerous other general purpose or special purpose computing system environments, configurations, or devices.

Examples of the invention may be described in the general context of computer-executable instructions, such as program modules, executed by one or more computers or other devices in software, firmware, hardware, or a combination thereof. The computer-executable instructions may be organized into one or more computer-executable components or modules. Generally, program modules include, but are not limited to, routines, programs, objects, components, and data structures that perform particular tasks or implement particular abstract data types. Aspects of the invention may be implemented with any number and organization of such components or modules. For example, aspects of the invention are not limited to the specific computer-executable instructions or the specific components or modules illustrated in the Figures/Tables and described herein. Other examples of the invention may include different computer-executable instructions or components having more or less functionality than illustrated and described herein. Aspects of the invention transform a general-purpose computer into a special-purpose computing device when configured to execute the instructions described herein.

The order of execution or performance of the operations in examples of the invention illustrated and described herein is not essential, unless otherwise specified. That is, the operations may be performed in any order, unless otherwise specified, and examples of the invention may include additional or fewer operations than those disclosed herein. For example, it is contemplated that executing or performing a particular operation before, contemporaneously with, or after another operation is within the scope of aspects of the invention.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor may also be implemented as a combination of computing processing units.

In the subject specification, terms such as "data store," "data storage," "database," "cache," and substantially any other information storage component relevant to operation and functionality of a component, refer to "memory components," or entities embodied in a "memory" or components comprising the memory. It will be appreciated that the memory components, or computer-readable storage media, described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

When introducing elements of aspects of the invention or the examples thereof, the articles "a," "an," "the," and "said" are intended to mean that there are one or more of the elements. The terms "comprising," "including," and "having" are intended to be inclusive and mean that there may be additional elements other than the listed elements. The term "exemplary" is intended to mean "an example of." The phrase "one or more of the following: A, B, and C" means "at least one of A and/or at least one of B and/or at least one of C".

Having described aspects of the invention in detail, it will be apparent that modifications and variations are possible without departing from the scope of aspects of the invention as defined in the appended claims. As various changes could be made in the above constructions, products, and methods without departing from the scope of aspects of the invention, it is intended that all matter contained in the above description and shown in the accompanying drawings shall be interpreted as illustrative and not in a limiting sense.

Although the subject matter has been described in language specific to structural features and/or acts, it is to be understood that the subject matter defined in the appended claims is not necessarily limited to the specific features or acts described above. Rather, the specific features and acts described above are disclosed as examples of implementing the claims and other equivalent features and acts are intended to be within the scope of the claims.

What is claimed is:

1. A method comprising:
   monitoring detection chamber readings from a plurality of detectors, each of the plurality of detectors including a detection chamber separate from a detection chamber of others of the plurality of detectors;
   identifying an anomaly in the detection chamber readings;
   determining one or more detectors from the plurality of detectors each having an anomaly from the detection chamber readings; and
   executing an alert based on the anomaly in the detection chamber readings;
   wherein the detection chamber readings comprise readings of light scattered by airborne particles when the airborne particles enter a detection chamber of the plurality of detectors, wherein a transmitter transmits a light which is scattered by the airborne particles and received by a photo electric receiver;
   wherein the detection chamber readings further comprise light intensity and air velocity inside the detection chamber, wherein the light intensity and the air velocity inside the detection chamber are identified and compared with the light intensity and the air velocity of other proximate detectors.

2. The method of claim 1, wherein the anomaly in the detection chamber readings is identified on determining constant detection chamber readings or variation in the detection chamber readings within a predetermined limit for a predetermined time.

3. The method of claim 1, wherein the anomaly in the detection chamber readings is identified if the difference between current detection chamber readings and past detection chamber readings of the one or more detectors is above a predetermined threshold value.

4. The method of claim 1, wherein the anomaly in the detection chamber readings is identified if the difference between the detection chamber readings of the one or more detectors and other proximate detectors is above a predefined limit.

5. The method of claim 1, wherein the anomaly in the detection chamber readings is identified if the one or more detectors provide constant detection chamber readings when the one or more detectors are initialized.

6. The method of claim 1, wherein the detection chamber readings correspond to amount of light received by the photo receiver after the scattering of light by airborne particles.

7. The method of claim 1, wherein the light intensity and the air velocity inside the detection chamber are identified and compared with the previous readings of the light intensity and the air velocity of the detection chamber.

8. The method of claim 1, wherein the alert is an alert message or an audio alarm executed on a control panel.

9. The method of claim 1, wherein each of the plurality of detectors is a point detector.

10. A fire protection system comprising:
a monitoring unit for monitoring detection chamber readings received from a plurality of detectors, each of the plurality of detectors including a detection chamber separate from a detection chamber of others of the plurality of detectors;
an identification unit to identify an anomaly in the detection chamber readings;
a determination unit to identify one or more detectors from plurality of detectors each having an anomaly in detection chamber readings; and
a display unit to display a notification based on the anomaly in the detection chamber readings by executing an alert;
wherein the detection chamber readings comprise readings of light scattered by airborne particles when the airborne particles enter the detection chamber, wherein a transmitter transmits light which is scattered by the airborne particles and received by a photo electric receiver;
wherein the detection chamber readings further comprise light intensity and air velocity inside the detection chamber, wherein the light intensity and the air velocity inside the detection chamber are identified and compared with the light intensity and the air velocity of other proximate detectors.

11. The fire protection system of claim 10, wherein the anomaly in the detection chamber readings is identified on determining constant detection chamber readings or variation in the detection chamber readings within a predetermined limit for a predetermined time.

12. The fire protection system of claim 10, wherein the detection chamber readings are received by a control panel associated with the plurality of detectors.

13. The fire protection system of claim 10, wherein the anomaly in the detection chamber readings is identified if a difference between current detection chamber readings and past detection chamber readings of the one or more detectors is above a predetermined threshold value.

14. The fire protection system of claim 10, wherein the anomaly in the detection chamber readings is identified by if a difference between the detection chamber readings of the one or more detectors and other proximate detectors is above a predefined limit.

15. The fire protection system of claim 10, wherein amount of light received by the photo receiver after the scattering of airborne particles are detection chamber readings.

16. A non-transitory computer readable medium comprising one or more processors and a memory coupled to the one or more processors, the memory storing instructions executed by the one or more processors, the one or more processors configured to:
monitor detection chamber readings of a plurality of detectors, each of the plurality of detectors including a detection chamber separate from a detection chamber of others of the plurality of detectors;
identify an anomaly in the detection chamber readings;
determine one or more detectors from the plurality of detectors with the anomaly in the detection chamber readings; and
execute an alert based on the anomaly in the detection chamber readings;
wherein the detection chamber readings comprise readings of light scattered by airborne particles when the airborne particles enter a detection chamber of the plurality of detectors, wherein a transmitter transmits a light which is scattered by the airborne particles and received by a photo electric receiver;
wherein the detection chamber readings further comprise light intensity and air velocity inside the detection chamber, wherein the light intensity and the air velocity inside the detection chamber are identified and compared with the light intensity and the air velocity of other proximate detectors.

* * * * *